US008755972B2

(12) United States Patent
Aoki et al.

(10) Patent No.: US 8,755,972 B2
(45) Date of Patent: Jun. 17, 2014

(54) REAR WHEEL TOE ANGLE CONTROL SYSTEM FOR A VEHICLE

(75) Inventors: Yoshimasa Aoki, Wako (JP); Kuniyoshi Tanaka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 109 days.

(21) Appl. No.: 13/515,979

(22) PCT Filed: Dec. 15, 2010

(86) PCT No.: PCT/JP2010/007290
§ 371 (c)(1),
(2), (4) Date: Jun. 14, 2012

(87) PCT Pub. No.: WO2011/077669
PCT Pub. Date: Jun. 30, 2011

(65) Prior Publication Data
US 2012/0253608 A1    Oct. 4, 2012

(30) Foreign Application Priority Data

Dec. 25, 2009  (JP) .................. 2009-295510

(51) Int. Cl.
*B62D 6/00* (2006.01)
*B62D 17/00* (2006.01)
*B62D 5/04* (2006.01)
*B62D 7/15* (2006.01)
*B60G 7/00* (2006.01)
*B62D 7/14* (2006.01)

(52) U.S. Cl.
CPC .............. *B62D 17/00* (2013.01); *B62D 5/0418* (2013.01); *B60G 2202/422* (2013.01); *B62D 7/159* (2013.01); *B60G 2200/462* (2013.01); *B60G 7/006* (2013.01); *B62D 7/146* (2013.01)
USPC ........................................ 701/41; 280/86.75

(58) Field of Classification Search
CPC ............ B62D 6/00; B62D 9/00; B62D 17/00; B62D 5/04; G06F 7/00; G06F 3/016; G06F 3/03543; G06F 3/0338
USPC ............ 701/45, 80, 67, 38, 41; 180/446, 412, 180/400; 280/86.75, 5.522; 477/3; 74/493
See application file for complete search history.

(56) References Cited

U.S. PATENT DOCUMENTS 4,611,682 A * 9/1986 Yasuda et al. .................. 180/446
5,195,601 A * 3/1993 Voigt et al. ..................... 180/412

(Continued)

FOREIGN PATENT DOCUMENTS

EP          1892179          2/2008

(Continued)

OTHER PUBLICATIONS

European Search Report, Application No. 10838909.9, dated Aug. 9, 2013, 3 pages.

*Primary Examiner* — Fadey Jabr
*Assistant Examiner* — Luis A Martinez Borrero
(74) *Attorney, Agent, or Firm* — Rankin, Hill & Clark LLP (57) ABSTRACT

In a rear wheel toe angle control system, the toe angle response properties of the right and left wheels are prevented from differing from each other depending on the operating condition of the vehicle, and the handling of the vehicle can be improved. The rear wheel toe angle control system (10) comprises a control command angle computing unit (83) for setting a target toe angel for each rear wheel (5) according to an operating condition of the vehicle (V), an angle-length conversion unit (87) for setting a target operating amount of each electric actuator (11) according to the target toe angle, a stroke sensor (17) for detecting an actual operating amount of each electric actuator (11), a motor position feed back duty computation unit (89) for setting a control value of each electric actuator (11) according to the difference between the actual operating amount and the target operating amount, and a compensating unit (90) for compensating the control value according to a value such as the lateral acceleration of the vehicle body (1) which is associated with the axial force of each electric actuator (11).

16 Claims, 9 Drawing Sheets

(56) References Cited

U.S. PATENT DOCUMENTS

| | | | |
|---|---|---|---|
| 6,711,965 B2 * | 3/2004 | Tomaru et al. | 74/493 |
| 6,922,621 B2 * | 7/2005 | Kodama et al. | 701/41 |
| 7,565,947 B2 * | 7/2009 | Ogawa et al. | 180/444 |
| 7,584,819 B2 * | 9/2009 | Hidaka | 180/444 |
| 7,991,532 B2 * | 8/2011 | Miki et al. | 701/80 |
| 8,068,955 B2 * | 11/2011 | Yanagi | 701/43 |
| 8,239,100 B2 * | 8/2012 | Ueno et al. | 701/45 |
| 2001/0027893 A1 * | 10/2001 | Nishizaki et al. | 180/409 |
| 2002/0129988 A1 * | 9/2002 | Stout et al. | 180/400 |
| 2004/0260444 A1 * | 12/2004 | Winkelmann et al. | 701/67 |
| 2005/0016791 A1 * | 1/2005 | Fukushima et al. | 180/446 |
| 2006/0086560 A1 * | 4/2006 | Furusho et al. | 180/446 |
| 2006/0267559 A1 * | 11/2006 | Ueda | 322/89 |
| 2007/0205040 A1 * | 9/2007 | Miyasaka et al. | 180/444 |
| 2008/0054577 A1 * | 3/2008 | Horiuchi | 280/5.522 |
| 2008/0162009 A1 * | 7/2008 | Miki et al. | 701/80 |
| 2008/0182710 A1 * | 7/2008 | Shibata et al. | 477/3 |
| 2008/0203690 A1 * | 8/2008 | Horiuchi et al. | 280/86.75 |
| 2008/0243335 A1 * | 10/2008 | Rao et al. | 701/38 |
| 2009/0177348 A1 * | 7/2009 | Yanagi | 701/29 |
| 2010/0032597 A1 * | 2/2010 | Beer | 251/129.01 |
| 2010/0164189 A1 * | 7/2010 | Buma | 280/5.521 |
| 2010/0288576 A1 * | 11/2010 | Yamanaka | 180/443 |
| 2010/0320706 A1 * | 12/2010 | Horiguchi et al. | 280/5.521 |
| 2011/0006233 A1 * | 1/2011 | Sasaki et al. | 251/129.01 |
| 2011/0040447 A1 * | 2/2011 | Horiuchi | 701/41 |
| 2011/0144864 A1 * | 6/2011 | Kageyama | 701/41 |
| 2011/0264329 A1 * | 10/2011 | Limpibunterng et al. | 701/41 |
| 2011/0313624 A1 * | 12/2011 | Yanagi et al. | 701/49 |
| 2012/0059552 A1 * | 3/2012 | Mori et al. | 701/49 |

FOREIGN PATENT DOCUMENTS

| | | |
|---|---|---|
| EP | 2407370 A1 * | 1/2012 |
| JP | 9-030438 | 2/1997 |
| JP | 2008-164017 | 7/2008 |

* cited by examiner

(A) opposite phase (B) same phase

REAR WHEEL TOE ANGLE CONTROL SYSTEM FOR A VEHICLE

TECHNICAL FIELD

The present invention relates to a rear wheel toe angle control system for a vehicle for individually varying toe angles of rear wheels of the vehicle, and in particular to a technology for preventing the response properties of the right and left toe angles depending on operating conditions of the vehicle.

BACKGROUND OF THE INVENTION

In recent year, development efforts are directed to four wheel steering vehicles equipped with a rear wheel toe angle control system for variably controlling the rear wheel toe angles with the aim of improving the yaw response of the vehicle and the driving stability of the vehicle. In a known rear wheel toe angle control system, an electric actuator is provided in a connecting part between a lateral link or a trailing link of each rear wheel suspension system and the vehicle body such that the toe angles of the rear wheels can be individually varied by appropriately driving the electric actuators. See Patent Document 1, for instance.

The electric actuator typically consists of a linear actuator including an electric motor and a feed screw mechanism. The applicant of this application previously proposed an invention for preventing the dislodging of the output rod without increasing the size of the linear actuator. See Patent Document 2. When the toe angle of each rear wheel is varied by using such an electric actuator, it is a common practice to perform a feedback control by detecting the output (displacement) of the electric actuator, and comparing the actually measured output of the electric actuator with a target output corresponding to a target rear wheel toe angle.

PRIOR ART DOCUMENT(S)

Patent Document(s)

Patent Document 1: JP 09-030438A
Patent Document 2: JP 2008-164017A

SUMMARY OF THE INVENTION

Task to be Accomplished by the Invention

However, as the operating condition of the vehicle and/or the loading of the vehicle change, because the axial force that is applied to the electric actuator changes in a corresponding manner, the torque of the motor that is required to achieve a prescribed displacement changes, and this causes a change in the operating speed of the electric actuator. For instance, when the right and left electric actuators are subjected to axial forces of mutually opposite directions, one of the electric actuators operates at a high speed while the other electric actuator operates at a low speed. In other words, the tracking capabilities of the right and left electric actuators differ from each other. In such a case, when the two rear wheels are actuated at the same time to achieve a same toe angle, the time required for one of the rear wheels to achieve this toe angle may differ substantially from the time required for the other rear wheel. In other words, there may be some difference in the toe angle response between the two rear wheels, and this may impair the impression of the handling of the vehicle.

The present invention was made in view of such a problem of the prior art, and has a primary object to provide a rear wheel toe angle control system that can improve the impression of the handling of the vehicle.

Means to Accomplish the Task

To accomplish such a task, a first aspect of the present invention provides a rear wheel toe angle control system (10) for varying toe angles of rear wheels (5) of a vehicle individually by using a pair of electric actuators (11), comprising: a target toe angle setting unit (83) for setting a target toe angle for each rear wheel according to an operating condition of the vehicle; a target operating amount setting unit (87) for setting a target operating amount of each electric actuator according to the corresponding target toe angle; an actual operating amount detecting unit (17) for detecting an actual operating amount of each electric actuator; a control amount setting unit (89) for setting a control amount of each electric actuator; and a compensating unit (90, 93, 94) for compensating the control amount according to a value dependent on an axial force of the corresponding electric actuator. Here, the value dependent on an axial force of the corresponding electric actuator may include such values as the lateral acceleration, the fore and aft acceleration and the yaw rate of the vehicle, the vehicle speed and the suspension stroke that allows the load on the rear wheel to be computed.

According to the present invention, because the compensating unit compensates the control amount according to a value dependent on an axial force of the corresponding electric actuator, even when the right and left electric actuators are subjected to different axial forces owing to the operating condition and loading condition of the vehicle, the tracking performance of the electric actuators is improved in such a manner that the toe angle response properties of the electric actuators can be equalized.

According to a second aspect of the present invention, in the rear wheel toe angle control system (10) according to the first aspect of the present invention, the compensating unit (93, 94) is configured to compensate the control amount of one of the electric actuators whose axial force and drive force are directed in different directions.

When the tracking performances of the right and left electric actuators differ from each other, it is conceivable to adjust the control amounts of the both electric actuators, but it results in the reduction of the operating speed of the electric actuator whose tracking performance is higher than that of the other. In view of this problem, according to the second aspect of the present invention, by compensating the control amount of one of the electric actuators whose operating speed is reduced because the axial force and drive force thereof are directed in different directions, the tracking performances of the right and left electric actuators can be brought close to each other while maintaining the tracking performance of the electric actuator whose operating speed is not reduced by the axial force.

According to a third aspect of the present invention, in the rear wheel toe angle control system (10) according to the first aspect or the second aspect of the present invention, the compensating unit (90) compensates the control amount in dependence on a lateral acceleration of a vehicle body (1).

There are a number of factors that could change the axial force of the electric actuator, but the lateral force of the tire is considered to be a primary factor. Therefore, according to the third aspect of the present invention, the control amount is compensated according to the lateral acceleration of the vehicle body which is directly caused by the lateral force of the tire so that a favorable response can be achieved by the compensation.

According to a fourth aspect of the present invention, in the rear wheel toe angle control system (10) according to the first aspect of the present invention, the compensating unit (94) compensates the control amount in dependence on the actual operating amount detected by the actual operating amount detecting unit.

When the tracking performances of the right and left electric actuators differ from each other, by compensating the control amount in dependence on the actual operating amount detected by the actual operating amount detecting unit, the operating speed of the electric actuator whose tracking performance is lower is increased, and the toe angle response properties of the right and left rear wheels can be brought equal to each other.

Effect of the Invention

According to the present invention, the toe angle response properties of the right and left wheels are prevented from differing from each other depending on the operating condition of the vehicle, and the handling of the vehicle can be improved.

DETAILED DESCRIPTION OF THE PREFERRED EMBODIMENTS

A vehicle V incorporated with a rear wheel toe angle control system embodying the present invention is described in the following with reference to the drawings. In the following description, each wheel and the parts associated therewith such as a tire and an electric actuator are denoted with a numeral followed by a suffix L or R depending on which side of the vehicle body the relevant part is located. For instance, the rear wheels are indicated as a rear wheel 5L (left wheel) and a rear wheel 5R (right wheel), and are also collectively indicated as rear wheels 5.

Figure 1:
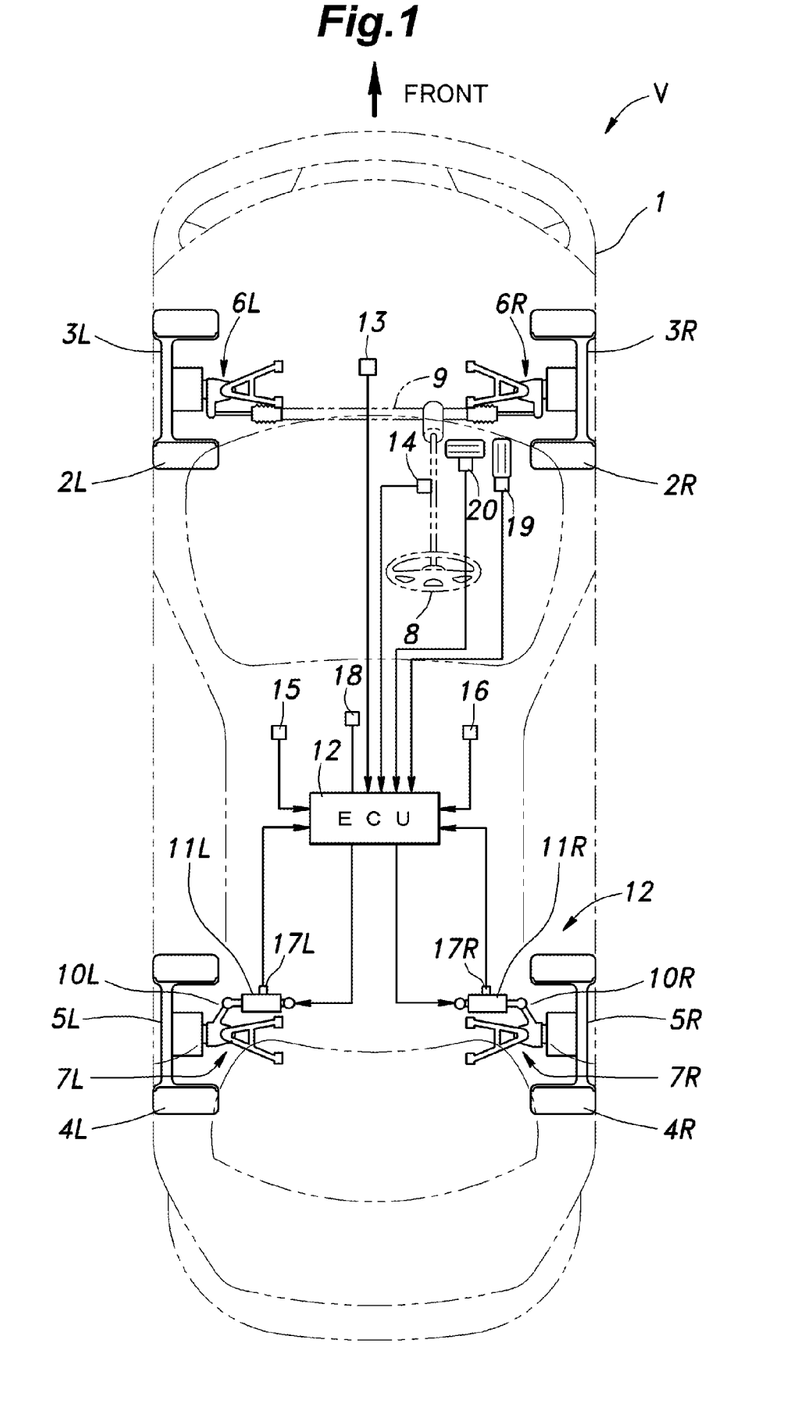
FIG. 1 is a schematic block diagram showing a vehicle equipped with a rear wheel toe angle control system embodying the present invention.

As shown in FIG. 1, the vehicle V consists of a four wheel automobile including a pair of front wheels 3L and 3R each fitted with a tire 2L, 2R, and a pair of rear wheels 5L and 5R each fitted with a tire 4L, 4R, and these wheels are supported by the vehicle body 1 via corresponding front suspension systems 6L and 6R and corresponding rear suspension systems 7L and 7R, respectively.

The vehicle V further comprises a front wheel steering system 9 that allows the front wheels 3L and 3R to be directly steered or turned as a steering wheel 8 is turned manually via a rack and pinion mechanism, and a pair of rear wheel toe angle control devices 10 that allow the toe angles of the rear wheels 5L and 5R to be individually varied by corresponding electric actuators 11L and 11R provided in the corresponding rear suspension systems 7L and 7R.

This vehicle V further comprises an ECU (electronic control unit) 12 for controlling the toe angles of the rear wheels 5 by activating the electric actuators 11, a vehicle speed sensor 13, a front wheel steering angle sensor 14, a yaw rate sensor 15, a lateral acceleration sensor 16, a fore and aft acceleration sensor 18, an accelerator pedal sensor 19, a brake pressure sensor 20 and other sensors not shown in the drawings, and the output signals of these sensors are forwarded to the ECU 12 for controlling the various functions of the vehicle V.

The ECU 12 includes a microcomputer, ROM, RAM, peripheral circuits, input and output interfaces and various drivers, and is connected to the sensors 13 to 20 and the electric actuators 11L and 11R via communication lines. The ECU 12 is configured to compute target rear wheel toe angles according to the output signals of the various sensors 13 to 20, and determines the target stroke positions (displacements) of the electric actuators 11L and 11R that are required to achieve the computed rear wheel toe angles.

Each electric actuator 11L, 11R consists of a linear actuator having an output rod that moves linearly in the axial direction thereof, and a stroke sensor 17L, 17R is provided in association with each electric actuator 11 for determining the stroke position of the output rod. The output signals of the stroke sensors 17L and 17R are forwarded to the ECU 12 for conducting a feedback control of the electric actuators 11L and 11R. Thereby, the output rod of each electric actuator 11L, 11R extends and retracts by an amount determined by the ECU 12, and the toe angles of the rear wheels 5L and 5R are varied in a corresponding manner.

In this vehicle V, by actuating the two electric actuators 11L and 11R simultaneously in a symmetric manner (or in opposite directions), the toe-in and toe-out of the rear wheels 5L and 5R can be freely controlled as desired. Additionally, by extending one of the electric actuators 11L and 11R and retracting the other electric actuator, the rear wheels 5L and 5R can be steered in either direction. For instance, the rear wheels may be put into a toe out configuration when the vehicle is accelerating and into a toe in configuration when the vehicle is decelerating according to the operating condition detected by the various sensors for an improved handling of the vehicle. Additionally or alternatively, the rear wheels may be both steered in the same direction as the front wheels when the vehicle is cornering at a high speed for an improved vehicle stability and in the opposite directions when the vehicle is cornering at a low speed for an improved responsiveness.

Figure 2:
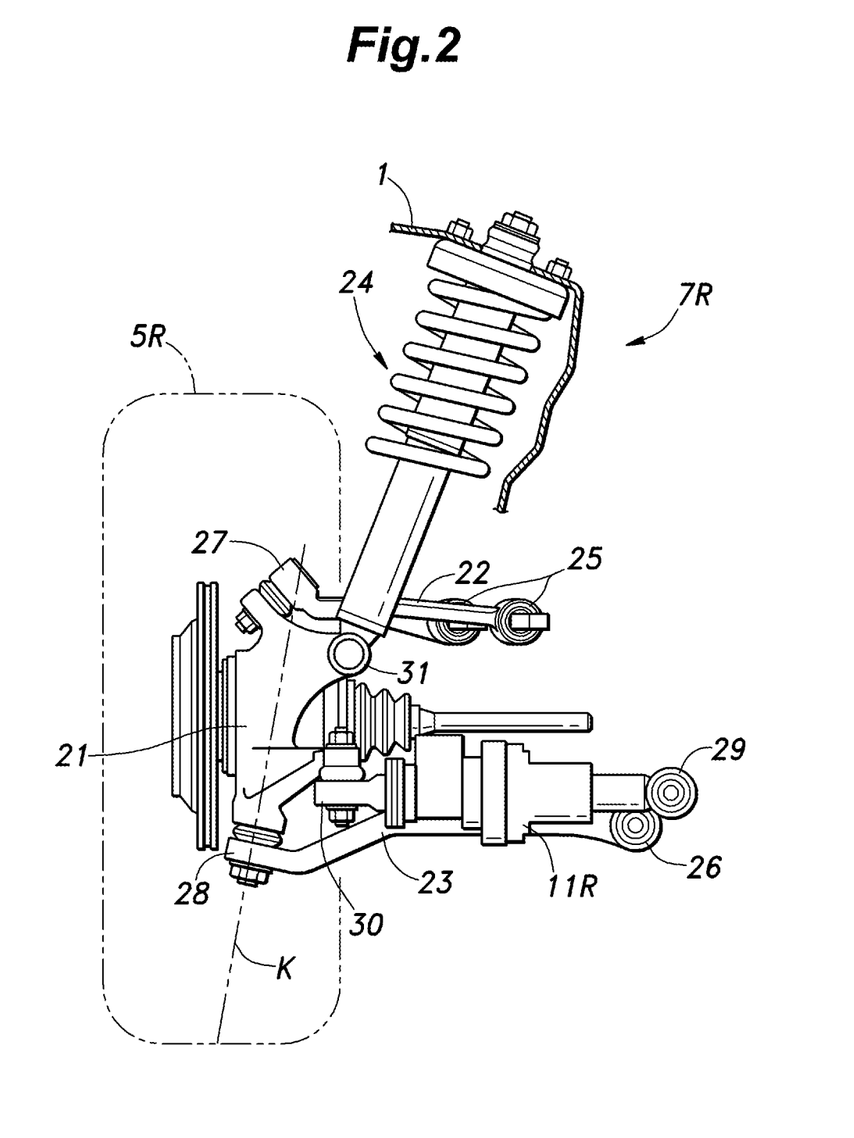
FIG. 2 is a front view of a rear suspension system shown in FIG. 1.

As shown in FIG. 2, each rear wheel suspension system 7R consists of a double wishbone type suspension system which comprises a knuckle 21 rotatably supporting the rear wheel 5R, an upper and lower arm 22 and 23 connecting the knuckle 21 to the vehicle body in a vertically moveable manner and a damper 24 including a compression coil spring and a hydraulic damper for damping the vertical movement of the rear wheel 5R, in addition to the electric actuator 11R which is connected between the knuckle 21 and the vehicle body 1 to vary the toe angle of the rear wheel 5R.

The upper arm 22 is connected to the vehicle body 1 at a base end thereof via a rubber bush joint 25 and to an upper part of the knuckle 21 at a free end thereof via a rubber bush joint 27, and the lower arm 23 is connected to the vehicle body 1 at a base end thereof via a rubber bush joint 26 and to a lower part of the knuckle 21 at a free end thereof via a rubber bush joint 28. Each electric actuator 11R is connected to the vehicle body 1 at a base end thereof via a rubber bush joint 29 and a front part of the knuckle 21 at a free end thereof via a rubber bush joint 30. The damper 24 including the suspension spring is connected to the vehicle body 1 at an upper end thereof, and to an upper part of the knuckle 21 at a lower end thereof via a rubber bush joint 31.

Thus, as each electric actuator 11R extends, the front part of the corresponding knuckle 21 turns in an outboard direction, and the corresponding rear wheel 5 is turned in an outward (toe-out) direction with respect to the traveling direction of the vehicle. Conversely, as each electric actuator 11R contracts, the front part of the corresponding knuckle 21 turns in an inboard direction, and the corresponding rear wheel 5R is turned in an inward (toe-in) direction with respect to the traveling direction of the vehicle.

<First Embodiment>

Figure 3:
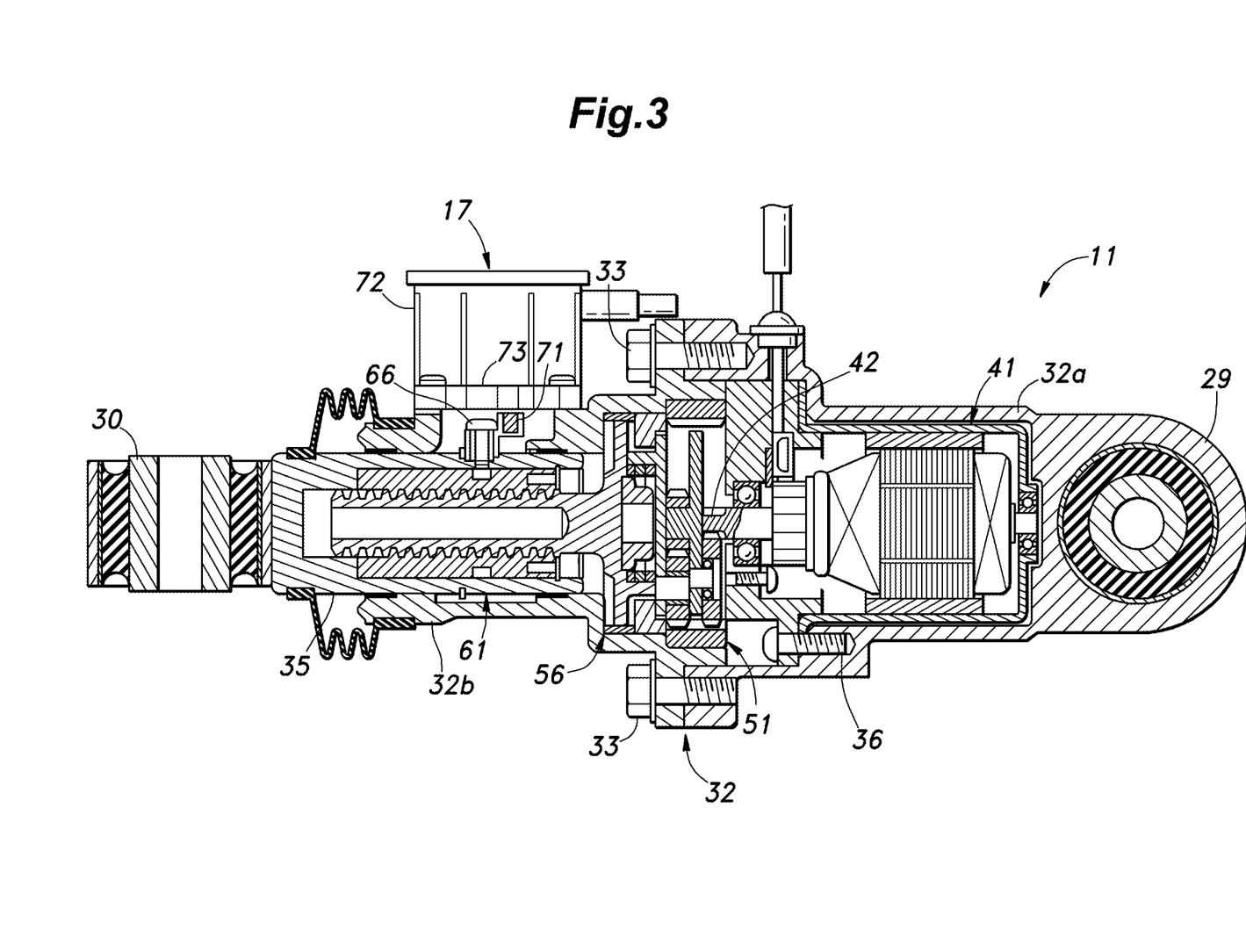
FIG. 3 is a vertical sectional view of an electric actuator shown in FIG. 2.

As shown in FIG. 3, the electric actuator 11R comprises a housing 32 consisting of a first housing part 32a fitted with a rubber bush joint 29 for attachment to the vehicle body 1 and a second housing part 32b fixedly secured to the first housing part 32a by using threaded bolts 33, and an output rod 35 supported by the second housing 32b in an extensible and retractable manner and fitted with a rubber bush joint 30 for attachment to the knuckle 21. The first housing part 32a receives an electric motor 41 serving as a drive source, and the electric motor 41 is secured to the first housing 32a by using threaded bolts 36. The second housing part 32b receives a planetary gear type reduction gear unit 51, an elastic coupling 56 and a feed screw mechanism 61 using a trapezoidal thread. When the electric motor 41 is activated, the rotation of a rotary shaft 42 thereof is reduced in speed by the reduction gear unit 51, and is converted into a linear movement of the output rod 35 via the feed screw mechanism 61.

The stroke sensor 17 is attached to an exterior surface of the second housing part 32b, and comprises a magnet 71 fixedly attached to the outer circumferential surface of the output rod 35 by a threaded bolt 66 and a differential transformer 73 received in a sensor housing 72. The differential transformer 73 is disposed adjacent to the magnet 71 and extends in parallel with the traveling direction of the output rod 35. The two ends of the differential transformer 73 are fixedly attached to the second housing part 32b. The differential transformer 73 includes a primary coil not and a pair of secondary coils having a same number of turns and located adjacent to the respective axial ends of the primary coil (although not shown in the drawings) so that the movement of the magnet 71 in the traveling direction of the output rod 35 induces voltages in the two secondary coils, and the difference between the induced voltages corresponds to the traveling stroke of the output rod 35.

Figure 4:
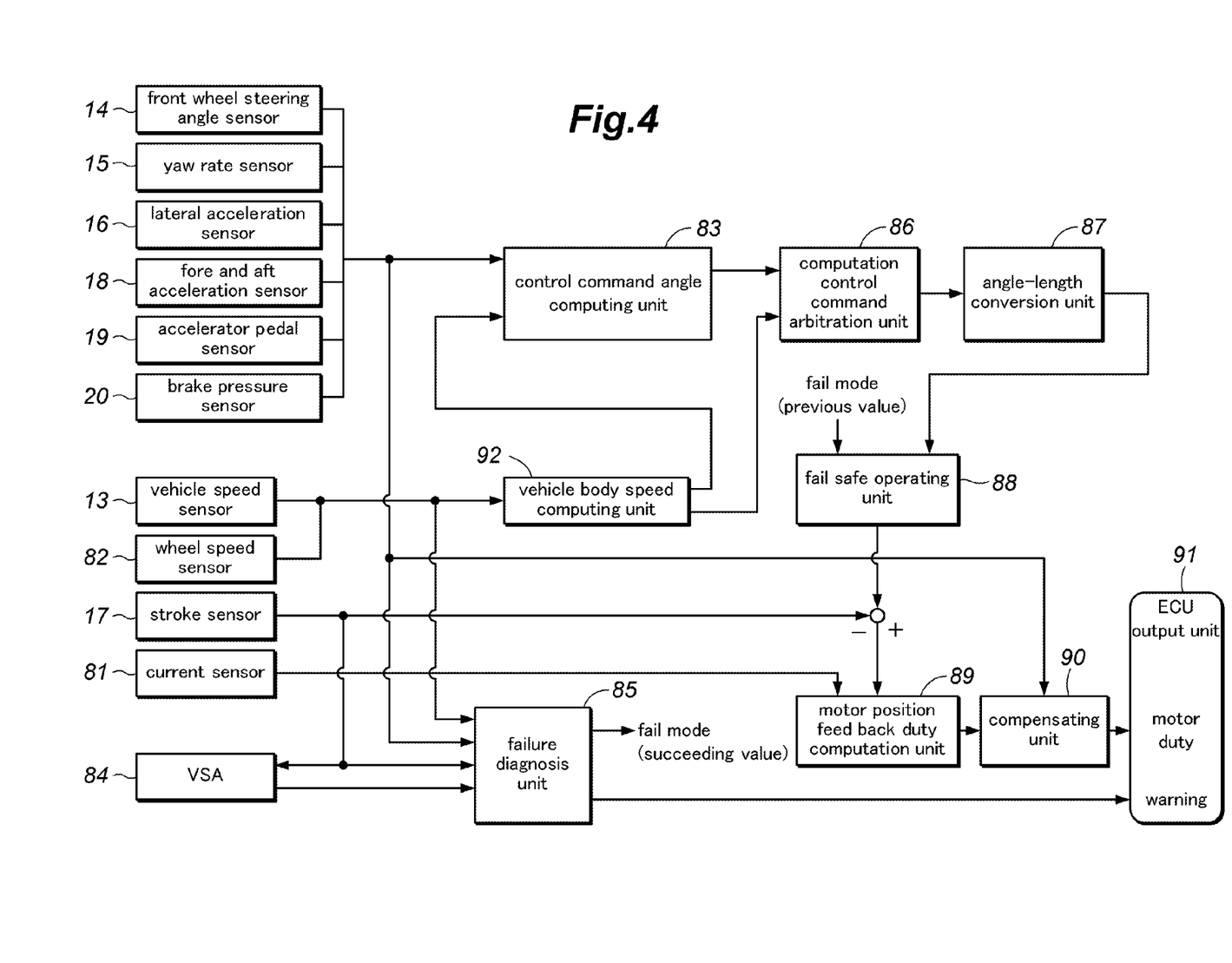
FIG. 4 is a block diagram showing the structure of an ECU of a first embodiment of the present invention.

FIG. 4 is a simplified block diagram of the control unit of the rear wheel toe angle control device 10. The ECU 12 comprises a vehicle body speed computing unit 92, a control command angle computing unit 83, a failure diagnosis unit 85, a computation control command arbitration unit 86, an angle-length conversion unit 87, a fail safe operating unit 88, a motor position feed back duty computation unit 89, a compensating unit 90 and an ECU output unit 91.

The outputs of the vehicle speed sensor 13 and the wheel speed sensor 82 provided in each wheel are converted into a vehicle body speed by the vehicle body speed computing unit 92. The vehicle body speed converted by the vehicle body speed computing unit 92 and the outputs of the front wheel steering angle sensor 14, the yaw rate sensor 15, the lateral acceleration sensor 16, the fore and aft acceleration sensor 18, the accelerator pedal sensor 19 and the brake pressure sensor 20 are forwarded to the control command angle computing unit 83. The overall control output or the target rear wheel toe angle is obtained from the control output of the control command angle computing unit 83 according a prescribed cooperative control logic. The target rear wheel toe angle is forwarded to the computation control command arbitration unit 86 so that the target rear wheel toe angle is restricted within an acceptable range for the given vehicle body speed. More specifically, the upper limit of the sum of the toe angles of the right and left rear wheels is set for the given vehicle body speed so that the sum of the toe angles of the right and left rear wheels is maintained below this upper limit or within a normal control range. The output value (angle value) of the computation control command arbitration unit 86 is forwarded to the angle-length conversion unit 87 to be converted into a displacement value corresponding to the output of the stroke sensor 17 for detecting the displacement of the output rod 35 of each electric actuator 11.

By setting the upper limit of the sum of the right and left wheel toe angles that is permitted for the given vehicle body speed by the computation control command arbitration unit 86, an excessive toe angle can be avoided without regard to the cause thereof, and the reliability of the system can be improved. This structure can be used as a backup feature for a separately provided fail safe arrangement, or a part thereof. It is also possible to set an upper limit for each of the right and left rear wheel toe angles, instead of the sum of the right and left rear wheel toe angles.

The output of the angle-length conversion unit 87 is forwarded to the fail safe operating unit 88 which refers to the previous value obtained from the failure diagnosis unit 85 as will be described hereinafter, and shuts down the output of the target rear wheel toe angle when the previous value indicates a failure. When the previous value does not indicate a failure, the deviation between the output of the target rear wheel toe angle and the output of the stroke sensor 17 is forwarded to the motor position feed back duty computation unit 89 which in turn produces a duty signal (control amount signal) for driving the electric actuator 11. The output of a current sensor 81 for detecting the current supplied to the motor of the electric actuator 11 is also forwarded to the motor position feed back duty computation unit 89 to be used for the required feedback control.

The output of the motor position feed back duty computation unit 89 is forwarded to the ECU output unit 91 via the compensating unit 90, and the ECU output unit 91 supplies a corresponding current to the motor of the electric actuator 11. The output of the lateral acceleration sensor 16 is forwarded to the compensating unit 90 which compensates the duty signal of the motor position feed back duty computation unit 89 according to the output of the lateral acceleration sensor 16 when the directions of the drive force of the electric actuator 11 and the axial force due to an external force differ from each other. The mode of operation of the compensating unit 90 in performing the compensation is described in the following.

When the vehicle V makes a turn, owing to the friction between the road surface and the tires 4L and 4R, the rear wheels 5L and 5R are subjected to lateral forces that are directed in the same direction. In the rear suspension systems 7L and 7R of the illustrated embodiment, the road contact point of each tire 7L, 7R to which the lateral force is applied is located on the same side as the electric actuator 11L, 11R with respect to the kingpin axis K (See FIG. 2) defined by connecting the two ball joints 27 and 28, the lateral forces acting on the tires 4L and 4R cause to the electric actuators 11 axial forces which are directed in the same direction. When the vehicle V is traveling straight ahead, owing to the rolling resistance of the tires 4L and 4R and the geometry of the rear suspension systems 7L and 7R, an axial force may be applied to each of the electric actuators 11L and 11R.

Figure 5:
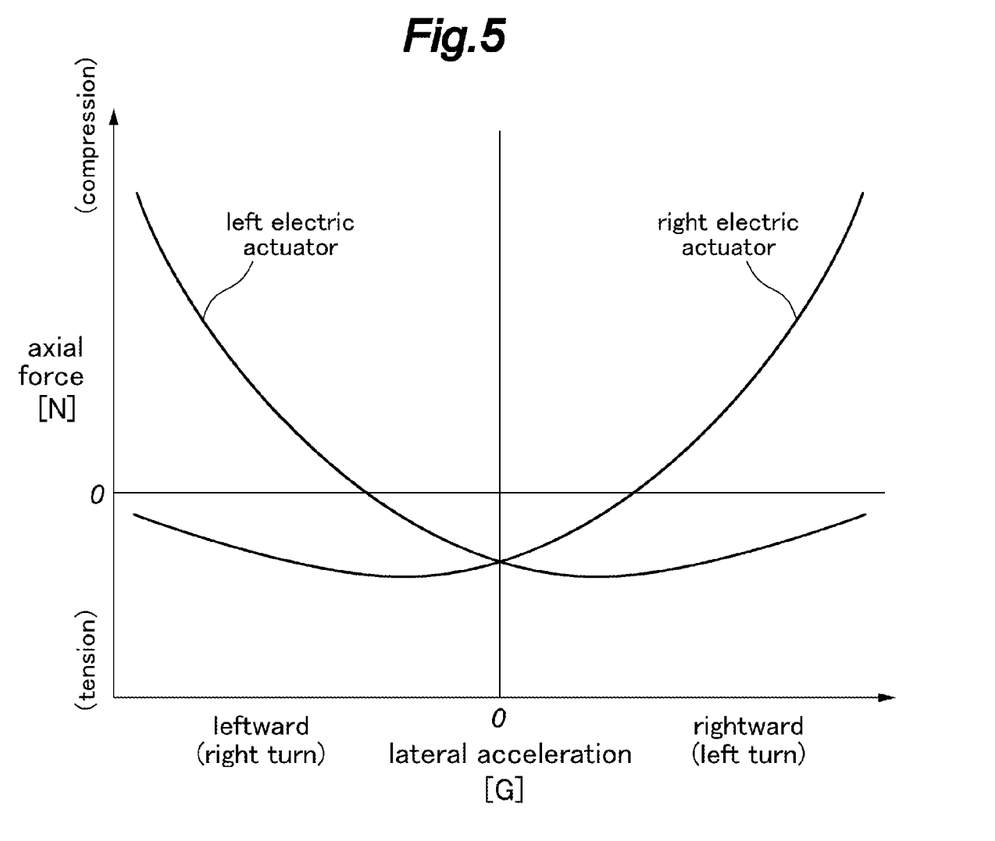
FIG. 5 is a graph showing the relationship between the lateral acceleration and the axial force of the electric actuator shown in FIG. 3.

FIG. 5 shows a graph representing the relationship between the lateral acceleration and the axial forces of the electric actuators 11L and 11R of the rear wheel suspension systems 7L and 7R of the illustrated embodiment. As shown in this graph, when the vehicle is traveling straight ahead or when the lateral force is zero, the right and left electric actuators 11L and 11R are both subjected to a tensile axial force. When making a right turn, the axial force of the outer electric actuator or the left electric actuator 11L changes to a compressive axial force. When making a left turn, the axial force of the outer electric actuator or the right electric actuator 11R changes to a compressive axial force. Therefore, the axial force of the outer electric actuator diminishes, and this causes a difference between the axial forces of the inner and outer electric actuators. When the rear wheels 5L and 5R are steered in the opposite phase to the front wheels 3L and 3R, as the actuating direction of the inner electric actuator 11 differs from the direction of the axial force, the operating speed of this (inner) electric actuator 11 decreases.

Figure 6:
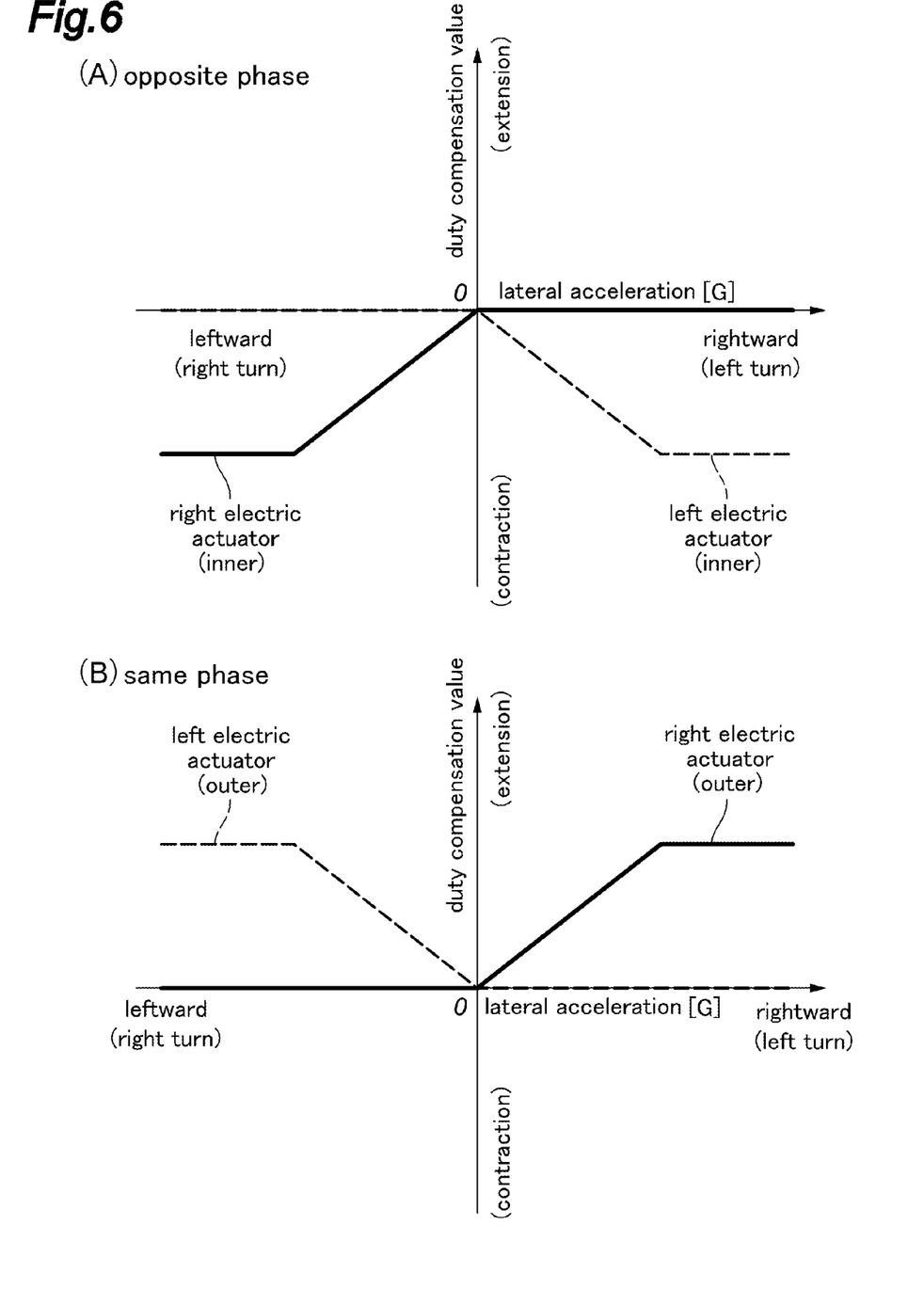
FIG. 6 is a map representing the property of a compensating unit of the ECU shown in FIG. 4.

Therefore, the compensating unit 90 compensates the duty signal according to a value associated with the axial force acting on the electric actuator 11 which in this case consists of the lateral acceleration, the lateral acceleration being related to the axial force as shown in FIG. 5. In other words, as shown in FIG. 6, the map configured to give a duty compensation value for the given lateral acceleration depending on the geometry of the rear suspension system 7L, 7R is looked up, and the duty compensation value retrieved from the map by using the detected value of the lateral acceleration sensor 16 as the search address is added to the duty value computed by the motor position feed back duty computation unit 89. More specifically, when the rear wheels 5L and 5R are steered in the opposite phase to the front wheels 3L and 3R during a cornering maneuver, the duty compensation value is added to the duty value for the electric actuator 11 on the inside of the curve as shown in (A). When the rear wheels 5L and 5R are steered in the same phase to the front wheels 3L and 3R during a cornering maneuver, the duty compensation value is added to the duty value for the electric actuator on the outside of the curve as shown in (B). In FIG. 6, the duty for driving the electric actuator 11 in the retracting direction is indicated by the negative sign, and the duty compensation value added to the retracting electric actuator 11 is indicated by the negative sign.

The vehicle V is equipped with a VSA (vehicle stability assist) system 84 as shown in FIG. 4 that improves the behavior of the vehicle when the operating condition of the vehicle detected by the various sensors is determined to be unstable or predicted to become unstable by adjusting the distribution of the braking force and/or the driving force between the right and left wheels. The failure diagnosis unit 85 evaluates the output of the stroke sensor 17 for measuring the displacement of the output rod 35 of the electric actuator 11 according to the outputs of the various sensors to detect the occurrence of a failure in the electric actuator 11. Upon detection of a failure, an ECU output lights up a warning lamp. At the same time, a fail signal is produced so that a prescribed fail action is performed, and is stored in non-volatile memory to be used as a previous value for the fail safe operating unit 88.

By estimating the decrease in the operating speed of the electric actuator 11 owing to the axial force applied thereto in dependence on the lateral acceleration of the vehicle body 1, and compensating the duty ratio in a corresponding manner, the compensating unit 90 prevents the drop in the operating speed of the electric actuator 11 which has to counteract the axial force. Because the compensating unit 90 compensates the control amount when the directions of the drive force and the axial force of the electric actuator differ from each other, the tracking performances of the right and left actuators 11L and 11R are brought close to each other while the tracking performance of the electric actuator 11 which does not suffer from the reduction in the operating speed owing to the axial force is maintained. As a result, the right and left rear wheels 5 are steered at a substantially same speed, and the toe angle response can be controlled in such a manner that the handling of the vehicle V is improved, and the behavior of the vehicle is stabilized.

<Modified Embodiment>

Figure 7:
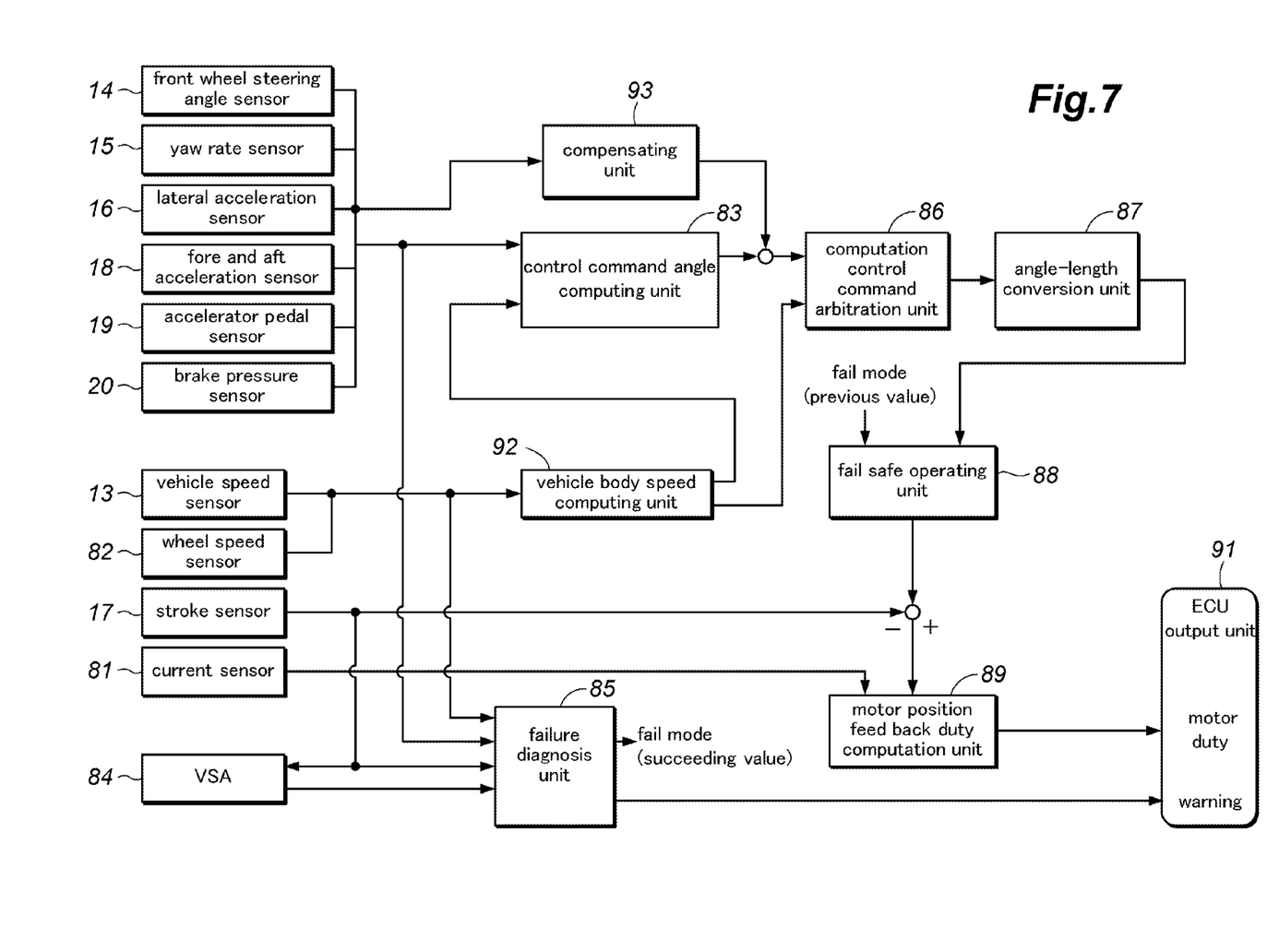
FIG. 7 is a block diagram showing the structure of an ECU given as a modification of the first embodiment.

A modification to the first embodiment is described in the following with reference to FIG. 7. In the following description, only the parts differing from those of the first embodiment are described while like parts are denoted with like numerals without repeating the description of such parts. The same is true with the second embodiment which will be discussed hereinafter.

In the modified embodiment, a compensating unit 93 is provided in parallel with the control command angle computing unit 83, instead of the compensating unit 90 provided on the output side of the motor position feed back duty computation unit 89. The compensating unit 93 receives the detection signal from the lateral acceleration sensor 16. The compensating unit 93 looks up a target rear wheel toe angle compensation map prepared in a similar manner as the duty compensation value map shown in FIG. 6 according to the detection value of the lateral acceleration sensor, and produces a target rear wheel toe angle compensation value which is to be added to the target rear wheel toe angle obtained by the control command angle computing unit 83 when the directions of the drive force of the electric actuator 11 and the axial force thereof caused by an external force differ from each other.

When the operation of the electric actuator 11 is slowed down owing to the axial force applied thereto, because the deviation of the target rear wheel toe angle produced from the fail safe operating unit 88 from the output value of the stroke sensor 17, the control unit 93 increases the absolute value of the duty, and prevents the steering speeds of the right and left front wheels 5 from different from each other.

<Second Embodiment>

Figure 8:
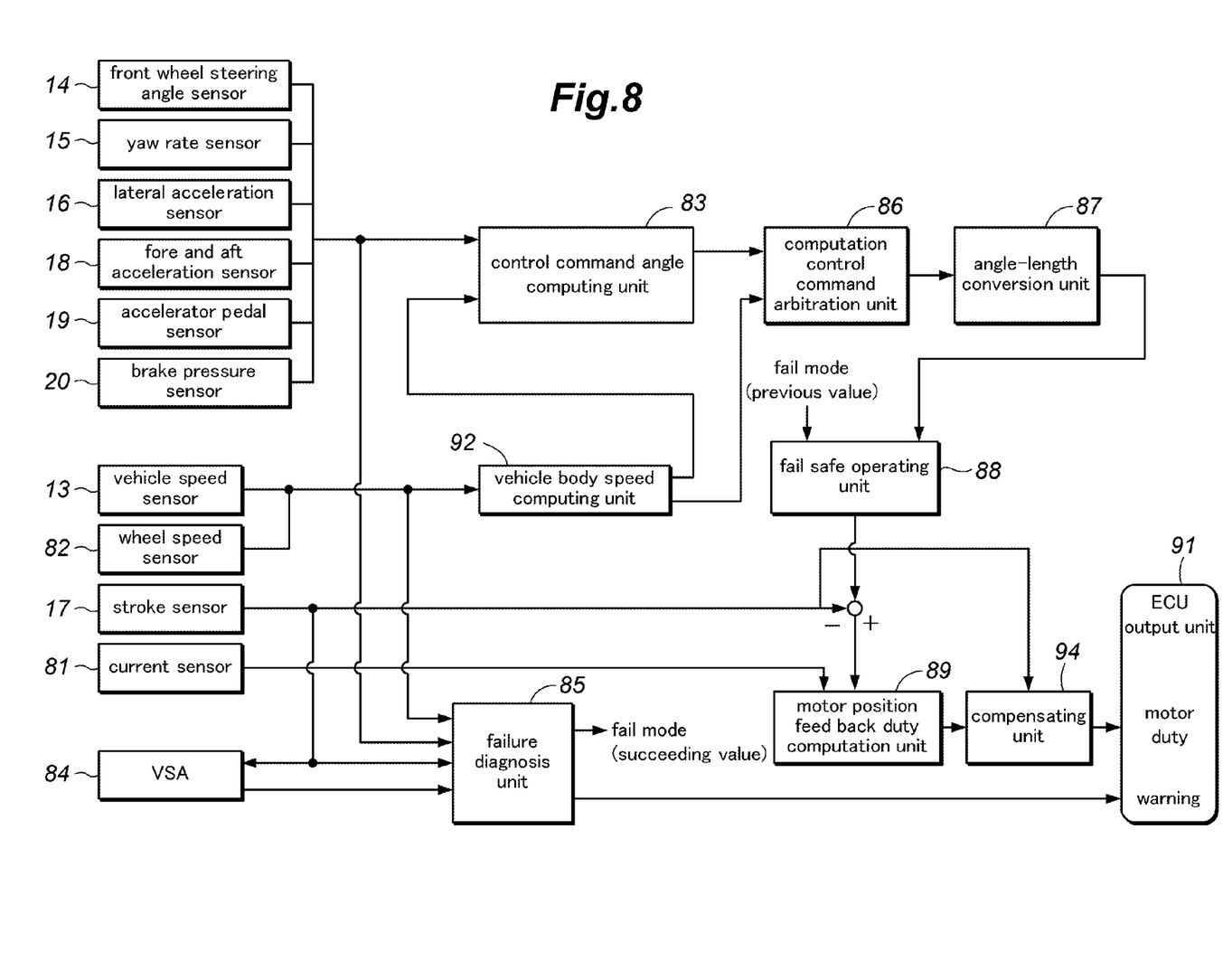
FIG. 8 is a block diagram showing the structure of an ECU given as a second embodiment of the present invention.
Figure 9:
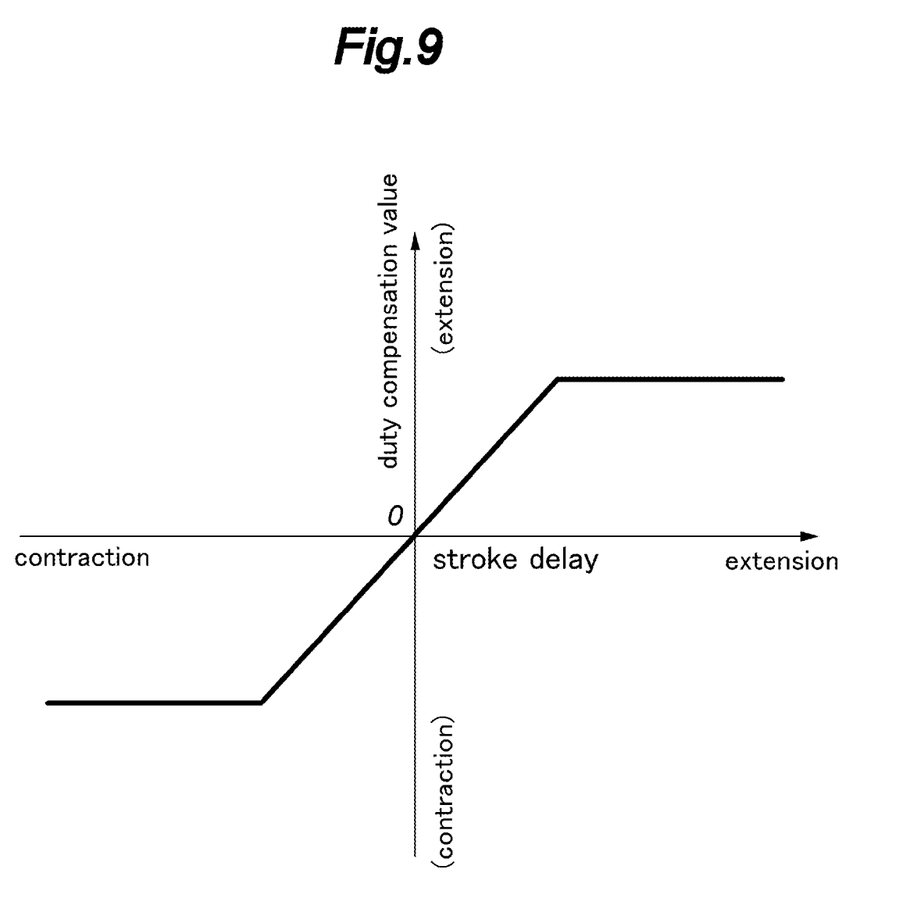
FIG. 9 is a map representing the property of a compensating unit of the ECU shown in FIG. 8.

The second embodiment of the present invention is described in the following with reference to FIG. 8. As shown in FIG. 8, the compensating unit 94 receives the detection signals of the stroke sensors 17, and compares the stroke positions of the right and left electric actuators 11 such that the duty signal from the motor position feed back duty computation unit 89 is compensated by adding a duty compensation value to the duty signal for the electric actuator 11 which is delayed in operation by looking up a map that gives a duty compensation value for each given delay in the stroke as shown in FIG. 9. In other words, the compensating unit 94 compensates the control value for the electric actuator 11 by using the deviation obtained from the output values of the stroke sensors 17 as the value associated with the axial force of the electric actuator 11. The compensating unit 94 forwards the compensated duty signal to the ECU output unit 91.

By using this compensating unit 94, the operating speed of the electric actuator 11 whose operation is delayed by the axial force is increased so that the difference between the steering speeds of the right and left rear wheels that could be cause by a delay in the operation of one of the electric actuators 11 can be avoided.

Although the present invention has been described in terms of preferred embodiments thereof, it is obvious to a person skilled in the art that various alterations and modifications are possible without departing from the scope of the present invention. For instance, although the value associated with the axial force of the electric actuator consisted of the lateral acceleration of the vehicle body in the foregoing embodiment, but other parameters such as the yaw rate and fore and aft acceleration of the vehicle body 1, the vehicle speed and the suspension stroke that can be used for computing the load acting on the rear wheel 5 may also be used. In such a case, a single parameter may be used, but, alternatively, a plurality of parameters may also be combined. The duty compensation value was obtained from a map using the lateral acceleration as the address in the foregoing embodiment, but it is also possible to build a vehicle model corresponding the property of the vehicle V, and compute the axial force from the parameters thereof. In the foregoing embodiments, because the duty signal was compensated only for the electric actuator 11 whose drive force and axial force are directed in different directions, when the rear wheels 5L and 5R are steered in the same or opposite phase to the front wheels 3L and 3R, the duty ratio of only one of the electric actuators 11 was compensated. However, it is also possible to compensate the duty values of the both electric actuators 11. These and other modifications of the structures and the arrangements of the various units and the compensation techniques can be made without departing from the spirit of the present invention.

GLOSSARY

V vehicle
1 vehicle body
5L, 5R rear wheel
10L, 10R rear wheel toe angle control unit
11L, 11R electric actuator
12 ECU
16 lateral acceleration sensor
17L, 17R stroke sensor (operating amount detecting unit)
83 control command angle computing unit (target toe angle setting unit)
87 angle-length conversion unit (target operating amount setting unit)
89 motor position feed back duty computation unit (control amount setting unit)
90, 93, 94 compensating unit

The invention claimed is:

1. A rear wheel toe angle control system for varying toe angles of rear wheels of a vehicle individually by using a pair of electric actuators, comprising at least one processor, the at least one processor comprising:
a target toe angle setting unit configured to set a target toe angle for each rear wheel according to an operating condition of the vehicle;
a target operating amount setting unit configured to set a target operating amount of each electric actuator according to the corresponding target toe angle;
an actual operating amount detecting unit configured to detect an actual operating amount of each electric actuator;
a control amount setting unit configured to set a control amount of each electric actuator; and
a compensating unit configured to compensate the control amount of each electric actuator set by the control amount setting unit,
wherein the compensating unit is configured to compensate the control amount of each electric actuator based on a value dependent on an axial force acting on the corresponding electric actuator and so as to cause tracking performances of the electric actuators in tracking the actual operating amount to the target operating amount to approach each other.

2. The rear wheel toe angle control system according to claim 1, wherein the compensating unit is configured to compensate the control amount in dependence on a lateral acceleration of a vehicle body.

3. The rear wheel toe angle control system according to claim 1, wherein the compensating unit is configured to compensate the control amount in dependence on the actual operating amount detected by the actual operating amount detecting unit.

4. The rear wheel toe angle control system according to claim 1, wherein the compensating unit is configured to compensate the control amount of each electric actuator by adding a compensation value to the control amount of each electric actuator set by the control amount setting unit, said compensation value determined based on the value dependent on the axial force.

5. The rear wheel toe angle control system according to claim 4, wherein the compensating unit is configured to determine a different compensation value for each electric actuator.

6. The rear wheel toe angle control system according to claim 4, wherein the value dependent on the axial force is a lateral acceleration of a vehicle body.

7. The rear wheel toe angle control system according to claim 1, wherein the axial force acting on the electric actuator opposes a drive force output by the electric actuator.

8. The rear wheel toe angle control system according to claim 1, wherein the compensating unit is configured to compensate the control amount of each electric actuator set by the control amount setting unit so as to yield a substantially same steering speed for each of the rear wheels.

9. A rear wheel toe angle control system for varying toe angles of rear wheels of a vehicle individually by using a pair of electric actuators, comprising at least one processor, the at least one processor comprising:
a target toe angle setting unit configured to set a target toe angle for each rear wheel according to an operating condition of the vehicle;
a target operating amount setting unit configured to set a target operating amount of each electric actuator according to the corresponding target toe angle;
an actual operating amount detecting unit configured to detect an actual operating amount of each electric actuator;
a control amount setting unit configured to set a control amount of each electric actuator; and
a compensating unit configured to compensate the control amount of one of the pair of electric actuators set by the control amount setting unit,
wherein the compensating unit is configured to compensate the control amount of the one of the pair of electric actuators on which an axial force acts in a direction different from a direction of a drive force output by the electric actuator, and the compensating unit is configured to compensate the control amount of the one of the pair of electric actuators based on a value dependent on the axial force acting on the one of the pair of electric actuators and so as to cause tracking performances of the electric actuators in tracking the actual operating amount to the target operating amount to approach each other.

10. The rear wheel toe angle control system according to claim 9, wherein the compensating unit is configured to compensate the control amount in dependence on a lateral acceleration of a vehicle body.

11. The rear wheel toe angle control system according to claim 9, wherein the compensating unit is configured to compensate the control amount in dependence on the actual operating amount detected by the actual operating amount detecting unit.

12. The rear wheel toe angle control system according to claim 9, wherein the compensating unit is configured to compensate the control amount of the one of the pair of electric actuators by adding a compensation value to the control amount of the one of the pair of electric actuators set by the control amount setting unit, said compensation value determined based on the value dependent on the axial force.

13. The rear wheel toe angle control system according to claim 12, wherein the value dependent on the axial force is a lateral acceleration of a vehicle body.

14. The rear wheel toe angle control system according to claim 9, wherein the axial force acting on the electric actuator opposes the drive force of the electric actuator.

15. The rear wheel toe angle control system according to claim 9, wherein the compensating unit is configured to compensate the control amount of the one of the pair of electric actuators set by the control amount setting unit so as to yield a substantially same steering speed for each of the rear wheels.

16. The rear wheel toe angle control system according to claim 9, wherein, among the pair of electric actuators, the compensating unit is configured to compensate the control amount of only the one of the pair of electric actuators.

* * * * *